United States Patent Office 3,351,629
Patented Nov. 7, 1967

3,351,629
BICYCLODECENES CONTAINING THREE
RING NITROGEN ATOMS
Rudolf G. Griot, Florham Park, N.J., assignor to
Sandoz Inc., Hanover, N.J.
No Drawing. Filed Apr. 1, 1964, Ser. No. 356,641
7 Claims. (Cl. 260—309.6)

This invention concerns compounds of the formula

(I)

wherein R is the residue of an α-(primary)amino mono-carboxylic acid, $H_2N$—R—COOH, which contains only one primary amino group,
therapeutically acceptable acid addition salts of said compounds (I), intermediates in the synthesis of said compounds (I) and processes for preparing any of the aforesaid compounds.

The primary α-amino acid, $H_2N$—R—COOH, is one wherein R is more specifically defined as

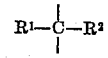

wherein each of $R^1$ and $R^2$ is, independently, either hydrogen (—H); lower alkyl, e.g. methyl, isopropyl and butyl; hydroxy(lower)alkyl, e.g. α-hydroxyethyl; (lower) alkyl-thio-(lower)alkyl, e.g. methyl thioethyl; phenyl (lower)alkyl, e.g. benzyl; substituted benzyl wherein the substituents comprise hydroxy (—OH), bromine (—Br) and/or iodine (—I) and are directly bound to a ring carbon atom, e.g. m,p-dihydroxybenzyl; indolyl(lower) alkyl, e.g. 3-indolylmethyl; imidazole(lower)alkyl, e.g. 4(or 5)-imidazolemethyl; or phenyl.
Alternatively, $R^1$ and $R^2$ are, together, either a saturated, e.g. pentamethylene, or an ethylenically unsaturated, e.g. pentadienyl-1,3-, hydrocarbon chain of from 2 to 8 carbon atoms.

Table A reflects some of the contemplated primary α-amino acids and the corresponding definitions of $R^1$ and $R^2$.

TABLE A

| | Name | Formula | $R^1$ | $R^2$ |
|---|---|---|---|---|
| 1 | Glycine | $CH_2(NH_2)COOH$ | H | H |
| 2 | α-Alanine | $CH_3CH(NH_2)COOH$ | $CH_3$ | H |
| 3 | Serine | $HOCH_2CH(NH_2)COOH$ | $HOCH_2$ | H |
| 4 | Threonine | $CH_3CH(OH)CH(NH_2)COOH$ | $CH_3CH(OH)$ | H |
| 5 | Valine | $(CH_3)_2CHCH(NH_2)COOH$ | $(CH_3)_2CH$ | H |
| 6 | Methionine | $CH_3S(CH_2)_2CH(NH_2)COOH$ | $CH_3S(CH_2)_2$ | H |
| 7 | Phenylalanine | C₆H₅—$CH_2CH(NH_2)COOH$ | C₆H₅—$CH_2$ | H |
| 8 | Dibromotyrosine | HO—(3,5-Br₂-C₆H₂)—$CH_2CH(NH_2)COOH$ | HO—(3,5-Br₂-C₆H₂)—$CH_2$ | H |
| 9 | Tryptophane | (3-indolyl)—$CH_2CH(NH_2)COOH$ | (3-indolyl)—$CH_2$ | H |
| 10 | Histidine | (4-imidazolyl)—$CH_2CH(NH_2)COOH$ | (4-imidazolyl)—$CH_2$ | H |
| 11 | α-Amino isobutyric acid | $H_2NC(CH_3)_2COOH$ | $CH_3$ | $CH_3$ |
| 12 | α-Phenyl glycine | C₆H₅—$CH(NH_2)COOH$ | C₆H₅— | H |
| 13 | α-Amino-cyclohexane carbonic acid | cyclo-C₆H₁₀($NH_2$)(COOH) | —$CH_2CH_2CH_2CH_2CH_2$— | |
| 14 | α-Methyl-α-phenyl glycine | $H_2NC(CH_3)$(C₆H₅)$COOH$ | C₆H₅— | $CH_3$ |

Compounds (I) and their pharmaceutically acceptable acid addition salts, e.g. hydrochlorides, fumarates, maleinates, tartrates, methane sulfonates, salicylates and hydrosulfates, are useful as CNS depressants and sedatives. They can be administered either orally or parenterally in doses of from 200 to 300 milligrams per day.

Compounds (I) and therapeutically acceptable acid addition salts thereof are also useful as intermediates in the preparation of saturated compounds of the structure

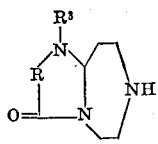
(II)

according to the reactions:

(A)
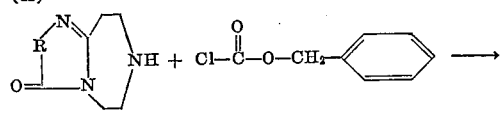

(B)
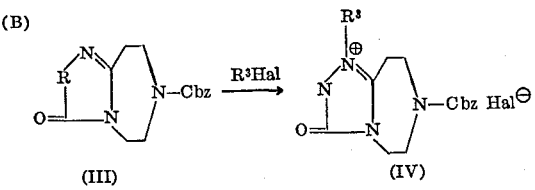

(C)
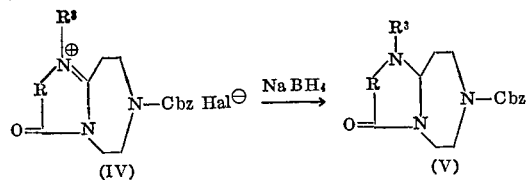

(D)
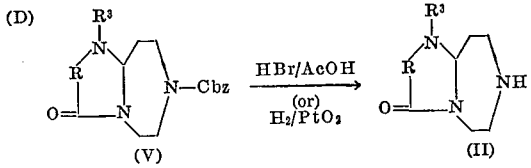

wherein $R^3$ is either hydrogen (—OH); lower alkyl, e.g. methyl, ethyl, propyl, isopropyl, butyl and hexyl; phenyl; or phenyl(lower)alkyl, e.g. benzyl;
Hal is either chlorine (—Cl), bromine (—Br) or iodine (—I);
Cbz is carbobenzoxy;
AcOH is acetic acid; and
R has the same meaning as hereinbefore defined.

Compounds (I) are also hydrogenated in an inert solvent according to well-known procedures with a platinum dioxide catalyst:

(E)
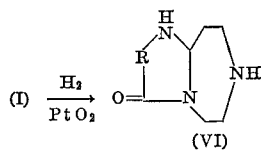

Compounds (VI) are further useful according to the reaction:

(F)
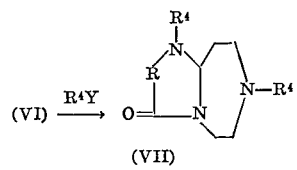

wherein $R^4$ is either hydrocarbon (saturated—lower alkyl, e.g. methyl, ethyl and propyl; ethylenically unsaturated lower aliphatic, e.g. allyl; acetylenically unsaturated lower aliphatic, e.g. propargyl; monocarbocylic aryl, i.e. phenyl; monocarbocylic ar(lower)-alkyl, e.g. benzyl) or carboxylic acid acyl [unsubstituted phenyl-keto-(lower)alkyl, e.g. phenyl-keto-propyl; substituted phenyl-keto-(lower)-alkyl, e.g. p-fluorophenyl-keto-propyl; (lower)-alkyl-keto-(lower) alkyl, e.g. propyl-keto-ethyl];
Y is either chlorine (—Cl) or bromine (—Br); and
R has the same meaning as hereinbefore defined.

Compounds (II), (VI), (VII), (X) and (XIII) and their pharmaceutically acceptable acid addition salts are useful in the same manner and for the same therapeutic purpose as compounds (I). The acid addition salts are prepared according to well-known procedures by neutralizing a solution of the free base with the acid of addition.

To afford an appreciation of the nature of the compounds and intermediates of the instant invention, a series of reaction schemes, illustrative of the utility of said compounds and intermediates, is presented. In the series, wherein each of R, $R^4$ and Y has its previously ascribed meaning;
$R^5$ has the same meaning as $R^4$;
Z has the same meaning as Y; and
AcOH means acetic acid,
starting from compound (III), which the title compound (h) of Example 4 is exemplary, compound (VI) is produced by conventional hydrogenation with a platinum catalyst. However, if only one molar equivalent of hydrogen is reacted, only the ring double bond is reduced to product compound (VIII). By a reaction comparable to (F) compound (VIII) is converted to compound (IX) which, upon further conventional hydrogenation, is transformed to compound (X). Reacting compound (X) with a halide, $R^5Z$, permits substitution on the remaining secondary nitrogen, i.e. the 4-position. Alternatively, treating compound (III) with a mixture of hydrobromic and acetic acids (see Example 5) results in splitting off the carbobenzoxy group without destroying the ring double bond, thus producing compound (I). The reaction of compound (I) with a halide, $R^5Z$, results in the substitution of —$R^5$ in the 4-position (compound XI). Conventional hydrogenation of compound (XI) reduces the ring double bond to produce compound (XII), which, by a reaction comparable to (F), is converted into compound (XIII),

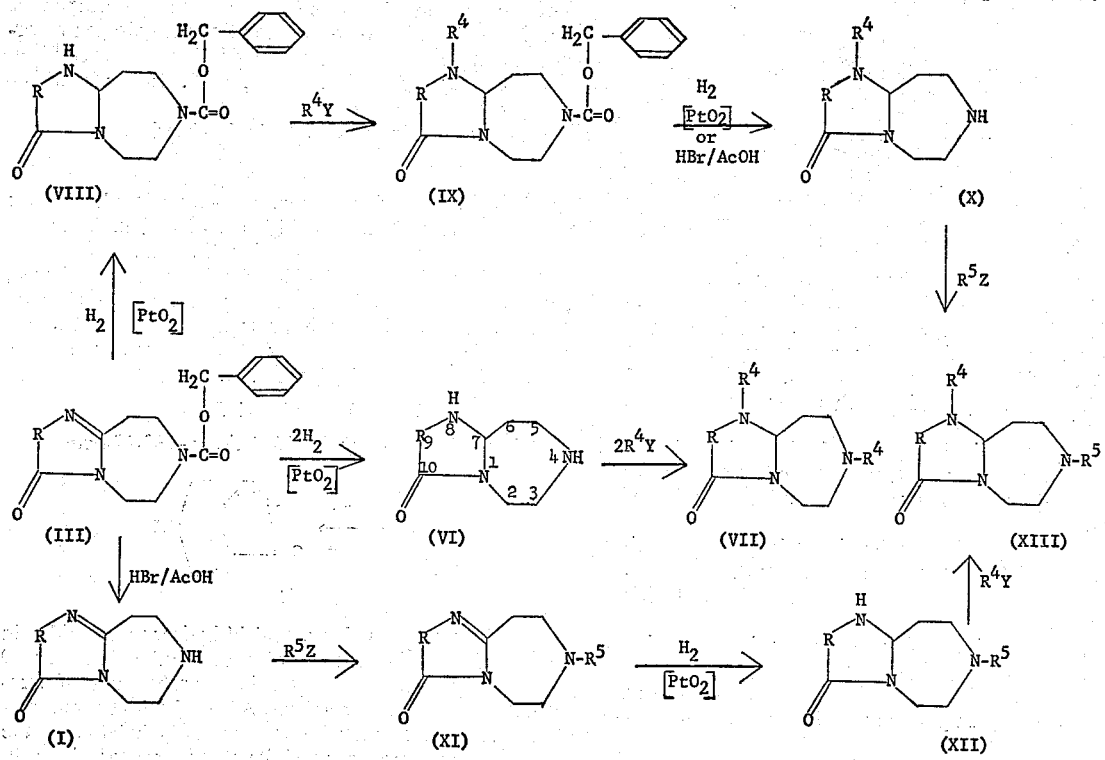

The preparation of compounds (I) is best illustrated by the following examples, in which the parts and percentages are by weight unless otherwise specified and the temperatures are in degrees Centigrade. The relationship between parts by weight and parts by volume is the same as that between the kilogram and the liter.

EXAMPLE 1

*1-carbobenzoxy-1,4-diazacycloheptane-5-one*

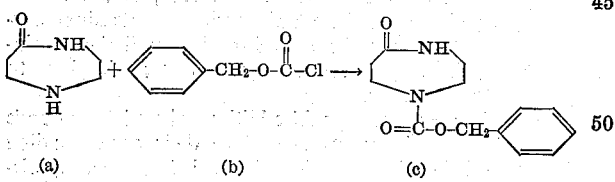

Admix 4.9 parts of 5-homopiperazinone hydrochloride (a), [See Dickerman, S. C., and Lindwall, H. G., "J. Org. Chem.," 14, 530 to 536 (1949)] with in excess of one equivalent of concentrated (aq) potash solution. Extract the resulting base with chloroform.

Dry the obtained extract over potassium carbonate ($K_2CO_3$) and concentrate to 200 parts by volume. Add 5.5 parts of triethylamine to said concentrate, and cool the resultant to 0°. Over a period of thirty minutes add 0.560 part of carbobenzoxychloride (b) (dissolved in 20 parts by volume of chloroform) dropwise to the cooled admixture. Stir the resultant at 0° for ninety minutes and thereafter at 20° for an additional ninety minutes.

Add 100 parts of ice and 100 parts by volume of 2 N hydrochloric acid to the resulting admixture, which subsequently separates into layers. Wash the organic phase with (aq) sodium bicarbonate solution. Dry the washed organic phase over magnesium sulfate ($MgSO_4$). Evaporate until a yellow oil remains. Add diethylether to the yellow oil to effect crystallization, melting point (M.P.) 110° to 112°, of the title compound (c). A yield of 4.98 parts is thus obtained.

An elemental analysis reveals the folowing comparison for $C_{13}H_{16}N_2O_3$—Calculated, percent: C, 62.9; H, 6.5; N, 11.3; O, 19.3. Found, percent: C, 63.3; H, 6.6; N, 11.1; O, 19.1.

EXAMPLE 2

*1-carbobenzoxy-5-ethoxy-1,4-diazacycloheptane-$\Delta^{4,5}$*

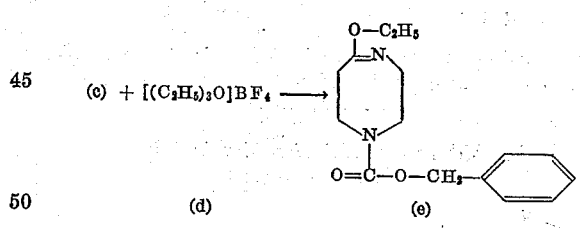

Over a period of 45 minutes and at a temperature of from 20° to 25° add 5.70 parts of (c) [dissolved in 50 parts by volume of methylene chloride ($CH_2Cl_2$)] to triethyloxoniumborofluoride (d), prepared from 4.65 parts of epichlorohydrin and 10 parts of boron trifluorideetherate [see Meerwein et al., "J. Prakt. Chem.," 154, 83 to 156 (1940)], dissolved in 50 parts by volume of absolute $CH_2Cl_2$. Stir the resulting reaction mixture at the above-noted temperature for 15 hours and then cool same to 5°. Thereafter introduce therein 10 parts of saturated (aq) potassium carbonate ($K_2CO_3$). Follow said introduction by vigorous stirring of the produced reaction mixture.

Separate the organic phase and dry same over $K_2CO_3$. Remove the organic solvent in vacuo, leaving an oil, boiling point (B.P.) 110° to 115°/0.005 mm. There are thus obtained 5.5 parts of title compound, having a refractive index, $\mu_D^{20}$, of 1.5290. Infrared spectra (5% in $CH_2Cl_2$) reveal adsorption at 1670 cm.$^{-1}$ (strong >C=N—).

An elemental analysis permits the following comparison for $C_{15}H_{20}N_2O_3$—Calculated, percent C, 65.2; H, 7.3; N, 10.1; O, 17.4. Found, percent: C, 65.4; H, 7.5; N, 10.2; O, 17.6.

EXAMPLE 3

*1-carbobenzoxy-1,4-diazacycloheptyl-5-imino acetate acid*

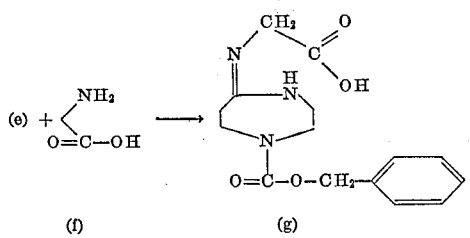

Stir overnight (15 to 17 hours) at room temperature (about 20°) a mixture of 5.5 parts of (e) with a suspension of 1.5 parts of glycine (f) in 16 parts by volume of methanol. Filter and dry the crystalline precipitate (g), M.P. 183.5° to 184° which forms. A yield of 5.1 parts of the title compound, which is very hygroscopic, is thus obtained.

Infrared spectra (in KBr) reveal absorption (broad and strong) at 1710 cm.$^{-1}$ (indicative of carbobenzoxy and $>C=N—$) and strong at 1630 cm.$^{-1}$ (indicative of $—COO^{\ominus}$).

An elemental analysis permits the following comparison for $C_{15}H_{19}N_3O_4$—Calculated, percent: C, 59.1; H, 6.6; N, 13.8; O, 21.0. Found, percent: C, 59.0; H, 6.3; N, 13.6; O, 21.0.

In place of glycine every other α-primary amino monocarboxylic acid having only one primary amino group reacts similarly to produce the corresponding product (XIV) according to the reaction:

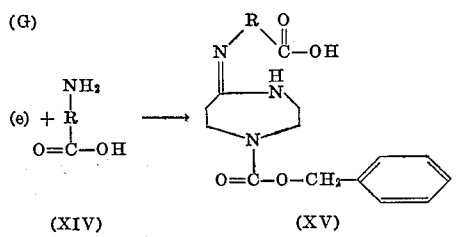

In reaction (G) compound (XIV) is, for example, each of the α-amino acids enumerated in Table A.

EXAMPLE 4

*4-carbobenzoxy-1,4,8-triazabicyclo[5,3,0]
decen-$\Delta^{7,8}$-10-one*

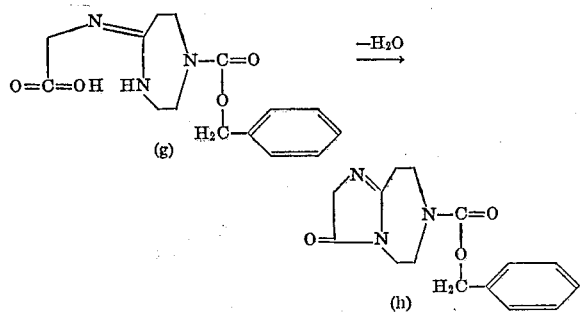

Reflux one part of the amidino acid (g) in 25 parts by volume of 2-methoxyethanol for 45 minutes. Evaporate the solvent in vacuo. Distill the remaining base (h), B.P. 150° to 155°/0.001 mm.

Infrared spectra (5% in CH$_2$Cl$_2$) reveal absorption at 1740 cm.$^{-1}$ (indicative of ring $>C=O$), at 1710 cm.$^{-1}$ (indicative of carbobenzoxy) and at 1650 cm.$^{-1}$ (indicative of $>C=N—$).

This example is illustrative of a class reaction:

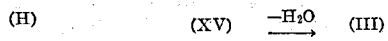

wherein R has the same meaning and scope as previously indicated.

The base (h) is a glasslike solid at 10°. To prepare the corresponding hydrochloride, dissolve compound (h) in isopropanol, and neutralize the resulting isopropanolic solution with an isopropanolic solution of hydrogen chloride. Upon neutralization, the hydrochloride crystallizes. Recrystallize said hydrochloride, M.P. 190°, from isopropanol.

An elemental analysis of the hydrochloride, $$C_{15}H_{18}ClN_3O_3$$

provides the following comparison—Calculated, percent: C, 55.6; H, 5.6; N, 13.0; O, 14.8; Cl, 10.9. Found, percent; C, 55.6; H, —; N, 12.8; O, 15.1; Cl, 10.9.

In similar manner acid addition salts are prepared from each compound (III). Exemplary of the acid addition salts are those which are pharmaceutically acceptable, such as fumarates, maleinates, tartrates, methane sulfonates, salicylates and hydrosulfates.

EXAMPLE 5

*1,4,8-triaza-bicyclo[5,3,0]decen-$\Delta^{7,8}$-10-one*

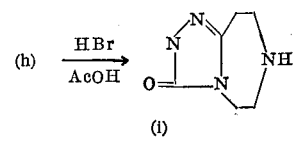

Add 15 parts by volume of 4 N hydrogen bromide (in acetic acid) to 0.310 parts of compound (h). After 10 minutes at room temperature, the hydrobromide of compound (i) begins to precipitate. After 1 hour at room temperature, add 300 parts by volume of diethylether to the existing admixture to precipitate the rest of the salt. Thereafter, discard the solvent and crystallize the residue from methanol, M.P. 256° (dec.).

Infrared spectra (KBr) reveal absorption at 3420 cm.$^{-1}$ (indicative of $—NH—$), strong absorption at 1800 cm.$^{-1}$ (indicative of $>N—C=O$) and medium absorption at 1655 cm.$^{-1}$ (indicative of $>C=N—$). An elemental analysis permits the following comparison for $$C_7H_{13}Br_2N_3O$$

Calculated, percent: C, 26.7; H, 4.2; N, 13.3; Br, 50.7. Found, percent: C, 27.0; H, 4.7; N, 13.1; Br 50.6.

To free the base (i), admix aqueous potassium carbonate solution with the hydrobromide until the admixture is alkaline. Evaporate the obtained organic phase to produce the free base.

In similar manner all said addition salts of compounds referred to herein are converted to their corresponding free base. If the free base is a liquid, it is purified by distillation; if it is a solid, by recrystallization.

This example is illustrative of a class reaction:

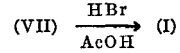

EXAMPLE 6

*1-carbobenzoxy-1,4,8-triazabicyclo[5,3,0]decan-10-one*

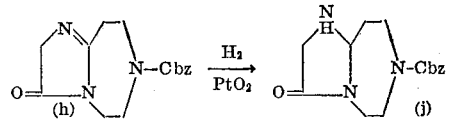

Dissolve 0.162 part of compound (h) in 25 parts by volume of methanol. To the resulting solution add 0.30 part of platinum oxide (PtO$_2$) and pass hydrogen gas therethrough. After 1 mole of hydrogen is taken up (30 minutes), filter off the catalyst, and evaporate the filtrate to dryness.

Infrared analyses (5% in CH$_2$Cl$_2$) reveal a broad band at 1700, indicating that the carbobenzoxy rest is still present. No band is found for $>C=N$.

This example is illustrative of a class reaction:

(J) 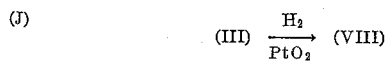

It is thought that the invention and its advantages will be understood from the foregoing description. It is apparent that various changes may be made in the processes, in the intermediates and in the final products without departing from the spirit and scope of the invention or sacrificing its material advantages, the processes, intermediates and final products hereinbefore described being merely illustrative of embodiments of the invention.

What is claimed is:

1. A compound of the formula

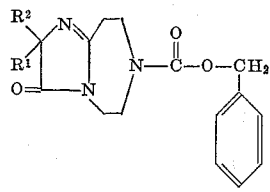

wherein each of $R^1$ and $R^2$ is either, independently, a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, and benzyl ring-substituted with at least one substituent selected from the group consisting of hydroxy, bromo and iodo; or, both taken together with the carbon atom to which they are bound, form a carbocyclic ring having from 3 to 9 carbon atoms and being selected from the group consisting of a saturated hydrocarbon ring and an ethylenically unsaturated hydrocarbon ring.

2. The compound of the formula

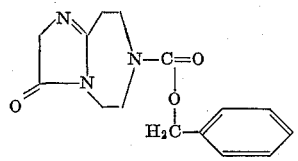

3. A compound which, in its free base form, has the formula

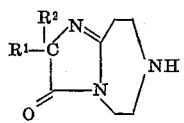

wherein each of $R^1$ and $R^2$ is, independently, a member selected from the group consisting of a hydrogen atom; lower alkyl; hydroxy(lower)alkyl; (lower)alkyl-thio-(lower)alkyl; phenyl(lower)alkyl; benzyl ring-substituted with at least one substituent selected from the group consisting of hydroxy, a bromine atom and an iodine atom; indolyl(lower)alkyl; imidazole(lower)alkyl; and phenyl.

4. A compound which, in its free base form, has the formula

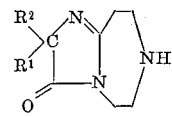

wherein $R^1$ and $R^2$ form, with the carbon atom to which they are both bound, a carbocyclic ring having from 3 to 9 carbon atoms and selected from the group consisting of a saturated hydrocarbon ring and an ethylenically unsaturated hydrocarbon ring.

5. The compound of the formula

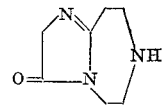

6. A member selected from the group consisting of a compound and pharmaceutically acceptable salts thereof, the compound having the formula

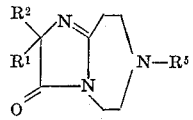

wherein each of $R^1$ and $R^2$ is either, independently, a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, and benzyl ring-substituted with at least one substituent selected from the group consisting of hydroxy, bromo and iodo; or, both taken together with the carbon atom to which they are bound, form a carbocyclic ring having from 3 to 9 carbon atoms and being selected from the group consisting of a saturated hydrocarbon ring and an ethylenically unsaturated hydrocarbon ring; and $R^5$ is a member selected from the group consisting of a lower aliphatic hydrocarbon radical, phenyl, phenyl(lower)alkyl, phenyl-keto-(lower)alkyl and (lower)alkyl-keto-(lower)alkyl.

7. The compound of the formula

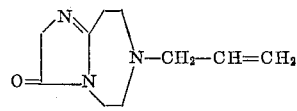

References Cited

UNITED STATES PATENTS 3,002,000  9/1961  Tietze et al. _____ 260—309.6

FOREIGN PATENTS 826,837  1/1960  Great Britain.

OTHER REFERENCES

Petersen et al.: Liebigs Annalen der Chemie, vol. 623 pages 166–76 (1959).

JOHN D. RANDOLPH, *Primary Examiner.*

WALTER A. MODANCE, *Examiner.*

N. TROUSOF, *Assistant Examiner.*